United States Patent
Bodoardo et al.

(10) Patent No.: US 9,484,574 B2
(45) Date of Patent: Nov. 1, 2016

(54) HYDROTHERMAL PROCESS FOR THE PRODUCTION OF LIFEPO₄ POWDER

(76) Inventors: Silvia Bodoardo, Turin (IT); Claudio Gerbaldi, Turin (IT); Giuseppina Meligrana, Turin (IT); Francesca Di Lupo, Turin (IT); Nerino Penazzi, Vercelli (IT); Daniela Fontana, Turin (IT)

(*) Notice: Subject to any disclaimer, the term of this patent is extended or adjusted under 35 U.S.C. 154(b) by 949 days.

(21) Appl. No.: 13/509,203

(22) PCT Filed: Nov. 10, 2009

(86) PCT No.: PCT/EP2009/008016
§ 371 (c)(1),
(2), (4) Date: Dec. 20, 2012

(87) PCT Pub. No.: WO2011/057646
PCT Pub. Date: May 19, 2011

(65) Prior Publication Data
US 2013/0130111 A1    May 23, 2013

(51) Int. Cl.
| | |
|---|---|
| *H01M 4/136* | (2010.01) |
| *C01B 25/45* | (2006.01) |
| *H01M 4/58* | (2010.01) |
| *H01M 10/0525* | (2010.01) |
| *H01M 4/1397* | (2010.01) |

(52) U.S. Cl.
CPC ............ *H01M 4/136* (2013.01); *C01B 25/45* (2013.01); *H01M 4/5825* (2013.01); *H01M 10/0525* (2013.01); *H01M 4/1397* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2009/0117020 A1* | 5/2009 | Manthiram et al. | 423/274 |
| 2009/0170003 A1* | 7/2009 | Chen et al. | 429/231.5 |
| 2011/0086270 A1* | 4/2011 | Amos et al. | 429/219 |

OTHER PUBLICATIONS

Rangappa et al., "Surface modified LiFePO4/C nanocrystals synthesis by organic molecules assisted supercritical water process", Journal of Power Sources 194 (2009) 1036-1042 [Published Jun. 24, 2009].*

(Continued)

*Primary Examiner* — Jeremiah Smith
(74) *Attorney, Agent, or Firm* — Sterne, Kessler, Goldstein & Fox PLLC (57) ABSTRACT

The present invention relates to a process for the production of LiFePO₄ powder, comprising the steps: a) providing an aqueous solution of an organic surfactant; b) providing an aqueous solution of an iron (II) salt and mixing said aqueous iron (II) salt solution with an aqueous solution of a phosphate, to provide a mixed iron (II) salt/phosphate solution having a stoichiometric ratio of $Fe^{2+}$:phosphate of about 1:1; c) adding the mixed iron (II) salt/phosphate solution to the surfactant solution under constant stirring; d) providing an aqueous solution comprising a lithium salt, adding said aqueous solution comprising a lithium salt to said mixed iron (II) salt/phosphate solution to provide a mixture having a stoichiometric ratio of $Fe^{2+}$:phosphate:lithium salt of about 1:1:3 and stirring the resulting mixture; e) heating the resulting mixture at 80-200° C.; f) washing the resulting precipitate to remove excess surfactant, filtering and drying the precipitate; and g) heat treating the dried precipitate in an inert atmosphere by firing at 550-850° C. for at least 2 hours, wherein a co-solvent is added during or after any one of steps (a) to (d).

18 Claims, 3 Drawing Sheets

SEM micrographs of the LiFePO₄ samples prepared without and with the addition of co-solvents

(56) References Cited

OTHER PUBLICATIONS

Chen, J., et al., "The Hydrothermal Synthesis and Characterization of Olivines and Related Compounds for Electrochemical Applications," *Solid State Ionics* 178: 1676-1693, Elsevier, The Netherlands (2008).

Meligrana, G., et al., "Hydrothermal Synthesis of High Surface $LiFePo_4$ Powders as Cathode for Li-Ion Cells," *Journal of Power Sources* 160(1): 516-522, Elsevier, The Netherlands (2006).

Rangappa, D., et al., "Surface Modified $LiFePO_4$/C Nanocrystals Synthesis by Organic Molecules Assisted Supercritical Water Process," *Journal of Power Sources* 194(2): 1036-1042, Elsevier, The Netherlands (Jun. 2009).

Wang, Y., et al., "Enhanced Electrochemical Performance of Unique Morphological $LiMnPO_4$/C Source Cathode Material Prepared by Solvothermal Method," *Solid State Communications* 150: 81-85, Elsevier, The Netherlands (2010).

International Search Report and Written Opinion for International Application No. PCT/EP2009/008016, European Patent Office, The Netherlands, mailed on Jun. 30, 2010, 9 pages.

\* cited by examiner

Fig. 1. Comparison between the X-ray diffraction profiles of the samples prepared by the use of different co-solvents Fig. 2 SEM micrographs of the LiFePO$_4$ samples prepared without and with the addition of co-solvents Fig. 3 Electrochemical behavior until very high current regimes of $LiFePO_4$ sample prepared without alcohol and with 20 % of ethanol or isopropanol.

HYDROTHERMAL PROCESS FOR THE PRODUCTION OF LIFEPO₄ POWDER

FIELD OF THE INVENTION

The present invention relates to a hydrothermal process for the production of $LiFePO_4$ powder, to $LiFePO_4$ powder obtainable by using the process, to a cathode material of a Li-ion cell comprising a $LiFePO_4$ powder as well as a Li-ion cell comprising an anode, a separator and a cathode comprising the above cathode material.

BACKGROUND OF THE INVENTION

Main efforts in the development of Li-ion systems are concerned with portable electronic devices, like portable phones, camcorders and lap-top computers, and are aimed at increasing the battery power density. Furthermore, there is a need for low cost, low pollution but high specific performance batteries especially in the huge market of electric vehicles (EVs) and hybrid-electric vehicles (HEVs) (see B. Scrosati, Nature 373 (1995), 557, and M. Piana et al., Ionics 8 (2002), 17). In particular, the development of materials for the positive electrode is one of the basic lines of research.

Mixed orthophosphates $LiMPO_4$ (where M=Mn, Fe, Co, Ne) are known in the art (see A. K. Padhi et al., J. Electrochem. Soc. 144 (1997) 1188). These mixed orthophosphates are isostructural to olivine and have been intensively studied as lithium insertion cathode materials for the next generation of Li-ion secondary batteries (see S. Franger et al., J. Power Sources 119-121 (2003), 252). Among these compounds the mineral triphylite, having the formula $LiFePO_4$ and showing an ordered olivine structure, has proven to be one of the most promising among the polyanionic compounds tested over recent years (see e.g. A. Yamada et al., J. Electrochem. Soc. 148 (2001) A 224).

This compound shows several advantages compared with conventional cathode materials such as $LiCoO_2$, $LiNiO_2$ and $LiMnO_2$, namely it is lower in toxicity and relatively inexpensive. In addition, $LiFePO_4$ has an interesting theoretical specific capacity of about 170 mAh $g^{-1}$, a good cycle stability and a technically attractive flat voltage versus current profile of 3.45 V versus $Li^+/Li$, due to a two-phase extraction/insertion process. A further advantage of this material, thanks to its stability, is the improved safety at high temperatures compared to the transition-metal oxides that lose oxygen on overcharging, which increases the probability of electrolyte decomposition at higher temperatures.

Lithium iron phosphate, at the first charge, can de-intercalate 1 $Li^+$ ion per formula unit, corresponding to the oxidation of $Fe^{2+}$ to $Fe^{3+}$. The extraction of $Li^+$ ions gives rise to a new phase, $FePO_4$ (heterosite), which maintains nearly the same structure: a and b lattice constants decrease slightly while c increases (M. Piana, et al., Ionics 8 (2002), 17, and A. K. Padhi, et al., J. B. Goodenough, J. Electrochem. Soc. 144 (1997), 1188). This feature assures that the process is highly reversible and repeatable.

The first investigations on $LiFePO_4$ as electrode material have put in evidence that capacity reached at room temperature is far below the theoretical one. Moreover, a reversible capacity loss is present throughout the charge-discharge cycles, increasing with the current density (A. K. Padhi, J. Electrochem. Soc. 144 (1997), 1188 and A. Yamada, et al., J. Electrochem. Soc. 148 (2001), A224). This capacity loss seems to be related to the limited area of the interface between the $LiFePO_4$ phases where the $Li^+$ extraction/insertion takes place. It is believed that the factor limiting the full conversion of $LiFePO_4$ to $FePO_4$ is based on the combination of low lithium ion diffusion rate and poor electronic conductivity (A. S. Andersson, J. O. Thomas, J. Power Sources 97-98 (2001), 498).

It has been readily recognized that the grain size is a critical issue to minimize high current capacity loss; e.g. 95% of the theoretical capacity at room temperature and at a current density higher than 0.1 $mAcm^{-2}$ were obtained using samples having 20 μm particle size (A. Yamada, et al., J. Electrochem. Soc. 148 (2001), A224).

Apart from increasing temperature, which can have a positive influence but is impractical for Li-ion batteries directed to a wide market, another possible way of improving $LiFePO_4$ performance is coating the grains with carbon, thus improving the capacity through an increase of conductivity (N. Ravet, et al., in: Proceedings of the ECS Meeting, Abstracts 99-2 (1999), 127, and N. Ravet, Abstract of IMLB-10 (2000), 166) or by using organic materials, like sucrose, added during preparation (N. Ravet, et al., J. Power Sources 97-98 (2001), 503, and S. Yang, P. Y. Zavalij, M. S. Whittingham, Electrochem. Commun. 3 (2001), 505). Further investigations were carried out on phospho-olivine compounds using ascorbic acid and citric acid as carbonaceous additives (M. Piana, et al., Ionics 8 (2002), 17, and N. Penazzi, J. Eur. Ceram. Soc. 24 (2004), 1381). Interesting results were obtained by adding fine particles of carbon black during the synthesis (P. P. Prosini, et al., Electrochim. Acta 46 (2001), 3517). The kinetic properties of $LiFePO_4$ can be improved by dispersing copper or silver into the solution during synthesis (F. Croce, et al., Electrochem. Solid State Lett. 5 (3) (2002), A47). The finely dispersed metal powder promoted a reduction of particle size and an increase in the material conductivity. It was also claimed that the electronic conductivity of $LiFePO_4$ could be increased by doping with metals supervalent to $Li^+$ (i.e. $M^{2+}$, $Al^{3+}$) (S. Chung, et al., Nat. Mater. 1 (2002), 123).

The next logical step was to try to get an efficient charge transport preparing a homogeneous active material with refined grains size and intimate carbon contact. Higher current density capacities were obtained from a $LiFePO_4/C$ composite containing 15% of carbon and a 100-200 nm particle size (H. Huang, et al., Electrochem. Solid State Lett. 4 (10) (2001), A 170). The progress in the design of olivine-type cathodes is illustrated by a cathode material preparation involving an addition of a "disordered conductive carbon" added to the precursor of the material, being 3% the minimum amount, and a subsequent stage of high energy ball milling to get nano-scale homogenized particles (A. Yamada, et al., J. Power Sources 119-121 (2003), 232).

Experience in this field has clearly shown that carbonaceous materials added to the precursors during synthesis have a fundamental importance in increasing the $LiFePO_4$ performance. They can act as reducing agents to avoid the formation of trivalent Fe ions during firing, maintain the particles isolated from each other preventing their coalescence and enhance intra and inter particle conductivity. The choice of the additive is, therefore, of marked importance: it will exert the deep influence previously described only if it can take part in the process itself, like in the synthetic routes followed previously (H. Huang, et al., Electrochem. Solid State Lett. 4 (10) (2001), A 170).

In this context, the kind of synthesis used becomes important too. Initially, the most common way of synthesizing $LiFePO_4$ was the solid-state route (A. Yamada, J. Electrochem. Soc. 148 (2001), A 224, and A. S. Andersson, et al., Electrochem. Solid State Lett. 3 (2) (2000), 66, M. Piana, et al., Ionics 8 (2002), 17, and N. Penazzi, et al., J.

Eur. Ceram. Soc. 24 (2004), 1381). Nevertheless, higher performing $LiMPO_4$ (where M=Fe, Mn) materials were obtained via a sol-gel synthetic route (M. Piana, et al., Solid State Ionics 175 (2004), 233). The amorphous precursors used allowed the production of sub-micrometric agglomerates smaller than those prepared via solid-state route and produced a very homogeneous carbon dispersion in the phosphate phase. More recently, hydrothermal preparation has been preferentially chosen for its advantages: quick, easy to perform, low cost in energy and easily scalable. With a solid-state reaction, 3 µm $LiFePO_4$ particles were obtained smaller than the 20 µm $LiFePO_4$ grains described in A. Yamada, et al., J. Electrochem. Soc. 148 (2001), A224.

Recent investigations concern the hydrothermal synthesis of $LiFePO_4$ powders using hexadecyltrimethylammonium bromide (G. Meligrana, et al. Journal of Power Sources 160 (2006), 516-522), which is added during synthesis.

The reference describes the preparation of lithium iron phosphate samples by direct mild hydrothermal synthesis. Starting materials were $FeSO_4 \cdot 7H_2O$, $H_3PO_4$, LiOH in the stoichiometric ratio 1:1:3 and hexadecyltrimethylammonium bromide $C_{19}H_{42}BrN$ (CTAB). First of all, a CTAB water solution was prepared, stirring the white powder in distilled water at 35° C. for approximately 30 min in order to completely dissolve it. $FeSO_4$ and $H_3PO_4$ water solutions were prepared and mixed together. The resulting solution was then added to the surfactant solution under constant stirring and only in the end, so avoiding the formation of $Fe(OH)_2$ which can be easily oxidized to $Fe^{3+}$, LiOH was added. The mixture, whose pH ranged between 7.2 and 7.5, was vigorously stirred for 1 min and then quickly transferred in a Teflon-lined stainless steel autoclave and heated at 120° C. for 5 h. The autoclave was then cooled to room temperature and the resulting green precipitate was washed, via a standard procedure to ensure complete elimination of the excess of surfactant, filtered and dried at 40° C. overnight. Heating treatment was carried out in inert atmosphere to avoid the oxidation of $Fe^{2+}$ to $Fe^{3+}$: the powders were pre-treated at 200° C. (heating rate of 5.0° C. $min^{-1}$) and then fired at 600° C. (2.0° C. $min^{-1}$) in pure $N_2$ for 12 h in order to obtain the crystalline phase and to carbonise the surfactant, so obtaining a carbon film that homogeneously covers the grains.

There remains a need in the art for an improved process for hydrothermal synthesis of $LiFePO_4$ powder having advantageous electro-chemical properties. In particular, there remains a need for $LiFePO_4$ powder having an increased performance at high discharge rates. For example, in the automotive field, batteries not only having a high capacity, but also providing for high discharge rates are desired. However, the prior art does not disclose how to modify hydrothermal synthesis of $LiFePO_4$ in order to provide an electro-chemically active powder having improved performance at high discharge regimes. The invention solves the above-described problems.

The present inventors surprisingly found that the use of an organic surfactant in a mixture of water and co-solvent during hydrothermal synthesis of $LiFePO_4$ results in a powder having improved electro-chemical properties especially at high discharge rates. The present invention is based on this finding.

SUMMARY OF THE INVENTION

The present invention relates to an improved process for hydrothermal synthesis of $LiFePO_4$ powder. The process of the present invention is characterized in the presence of a mixture of water and co-solvent during hydrothermal synthesis of $LiFePO_4$ powder using an organic surfactant. The use of a mixture of water and co-solvent results in improved electro-chemical properties especially at high discharge rates. On the other hand, the use of aqueous solutions only, as disclosed in the prior art, does not result in an improvement at high discharge regimes.

Accordingly, the present invention provides a process for the production of $LiFePO_4$ powder, comprising the steps: a) providing an aqueous solution of an organic surfactant; b) providing an aqueous solution of an iron (II) salt and mixing said aqueous iron (II) salt solution with an aqueous solution of a phosphate, to provide a mixed iron (II) salt/phosphate solution having a stoichiometric ratio of $Fe^{2+}$:phosphate of about 1:1; c) adding the mixed iron (II) salt/phosphate solution to the surfactant solution under constant stirring; d) providing an aqueous solution comprising a lithium salt, adding said aqueous solution comprising a lithium salt to said mixed iron (II) salt/phosphate solution to provide a mixture having a stoichiometric ratio of $Fe^{2+}$:phosphate: lithium salt of about 1:1:3 and stirring the resulting mixture; e) heating the resulting mixture at 80-200° C.; f) washing the resulting precipitate to remove excess surfactant, filtering and drying the precipitate; and g) heat treating the dried precipitate in an inert atmosphere by firing at 550-850° C. for at least 2 hours, wherein a co-solvent is added during or after any one of steps (a) to (d).

The use of a surfactant has a fundamental role of driving the synthesis to the formation of very fine powders. In addition, since the surfactant is an organic template, it is reduced to form a carbon coating on the particle surface, if treated in an inert atmosphere, resulting an increasing overall conductivity of the final cathode.

Without wishing to be bound by a particular theory, it is believed that adding a co-solvent to the aqueous solutions used during hydrothermal synthesis results in maintaining a greater amount of template after washing and in getting more carbon into the carbon layer or into the cathodic powder.

It is believed that the use of e.g. alcohols as co-solvent in the present synthesis procedure can play different roles. First of all, the co-solvents such as alcohols modify markedly the surface morphology of $LiFePO_4$ powders as observable by SEM observations. For example, the presence of alcohols may lead to the formation of greater particles. In addition, it is believed that the use of co-solvents such as alcohols results in the presence of a greater amount of carbon source such as organic surfactant before firing so that probably a thicker carbon layer is obtained on the particle surface.

In a preferred embodiment the organic surfactant comprises a cation of formula $NR_1R_2R_3R_4^+$, wherein $R_1$, $R_2$, $R_3$ and $R_4$ are independently from each other hydrocarbon chains. Preferably, $R_1$, $R_2$, $R_3$ and $R_4$ are independently selected from $C_1$-$C_{24}$ alkyl, $C_6$-$C_{24}$ aryl or $C_7$-$C_{24}$ aralkyl, more preferably one or two groups out of $R_1$, $R_2$, $R_3$ and $R_4$ are independently selected from $C_8$-$C_{20}$ alkyl or $C_7$-$C_{10}$ aralkyl, and the other two or three groups out of $R_1$, $R_2$, $R_3$ and $R_4$ are $C_1$-$C_4$ alkyl, still more preferably $R_1$ is $C_{10}$-$C_{18}$ alkyl, and $R_2$, $R_3$ and $R_4$ are $C_1$-$C_4$ alkyl. In a further preferred embodiment, the organic surfactant is selected from hexadecyltrimethylammonium bromide (CTAB), dodecyltrimethylammonium bromide (DTAB), or benzalkonium chloride, further preferably is CTAB or benzalkonium chloride, and most preferably is CTAB.

In a preferred embodiment, the aqueous solution of organic surfactant has a concentration of 0.3 to 1M, wherein the carbon-based and/or organic surfactant is preferably CTAB.

In a preferred embodiment the co-solvent is an alcohol, preferably a $C_1$-$C_4$ alcohol, more preferably is ethanol or isopropanol.

In a preferred embodiment the co-solvent is used in an amount of more than 0% by volume to up to 40% by volume, preferably 5% by volume to 35% by volume, based on the total volume of the final solution obtained in step (d).

In a further preferred embodiment, the co-solvent is added in step (a) to provide a solution of organic surfactant in a mixture of water and co-solvent.

In a preferred embodiment the step of heat treating the dried precipitate is carried out by firing at 600-700° C.

In a preferred embodiment firing is carried out for at least 10 hours.

In a preferred embodiment the organic surfactant is CTAB and the stoichiometric ratio of the total amount of CTAB to $LiFePO_4$ is in the range between 0.5 to 1 and 3 to 1, preferably is 1.5 to 1.

In a preferred embodiment the iron (II) salt is $FeSO_4$. In another preferred embodiment, the lithium salt is LiOH. In a further preferred embodiment, the phosphate is $H_3PO_4$.

The present invention also relates to a $LiFePO_4$ powder obtainable by using the above process The $LiFePO_4$ powder has preferably a carbon content of 1-5% by weight, wherein the organic surfactant used for its preparation is CTAB.

The $LiFePO_4$ powder has preferably a BET surface area of 15-60 $m^2$/g.

The present invention further relates to a cathode material for a Li-ion cell comprising the above $LiFePO_4$ powder.

The cathode material preferably further comprises an electric conductor and a binder. Suitable electric conductors are known in the art. Typical examples thereof include acetylene black, super-P carbon, carbon vulcan, ketjen black, graphite, multi-walled carbon nanotube (MWCNT) or conducting polymers (e.g., Polypyrrole, Polyaniline, Polythiophene, PEDOT, etc. . . . ). Furthermore, suitable binders are known in the art. Typical examples thereof include polyvinylidene fluoride (PVdF), polytetrafluoro ethylene (PTFE), olefin polymers (e.g., polyethylene, polypropylene, etc. . . . ), carboxymethyl cellulose (CMC) or gelatin.

The present invention further relates to a Li-ion cell comprising an anode, a separator and a cathode which comprises the cathode material as defined above.

DETAILED DESCRIPTION

The present invention relates to a hydrothermal process for the production of $LiFePO_4$ powder. The $LiFePO_4$ powder obtainable according to the inventive process is suitable in a cathode material for a lithium secondary battery. The lithium secondary battery using the $LiFePO_4$ powder according to the present invention has an advantageous electrochemical behaviour especially at high discharge rates (high C rate).

The term "hydrothermal" is used in the present invention as established in the art of providing $LiFePO_4$ particles, and refers to a wet process using a solvent mainly based on water in addition to thermal treatments.

The term "aqueous solution" refers according to the present invention to a solution using water as solvent, in case that no co-solvent is added to that specific solution. However, the term "aqueous solution" covers according to the present application also water-based solutions containing co-solvent.

The C rate is the specific current (referred to the $LiFePO_4$ mass) involved in extracting (discharge) or restoring (recharge) completely the charge C (mAh/g) of the cell in a certain t (h). It is given by dividing the charge C by the time t. In the present invention, we consider the discharge and the charge as complete when the potential cell value lowers more than the 30% or rises to a value higher than the 15% of the $LiFePO_4$ potential value taken as 3.45 V/Li respectively.

The real important aspect of the specific current is the normalization with respect to the active material mass. As for its representation, it in effect puts in evidence an interesting parameter: the discharge/charge rate. For example, C/10 discharge is a long overnight discharge but 60 C charge is a charge taking place in 1 minute.

It has been surprisingly found that the above advantage can be achieved by means of mixture of water and co-solvent being present during hydrothermal synthesis of $LiFePO_4$ powder using an organic surfactant. When using a mixture of water and co-solvent such as an alcohol, the discharge characteristics at high C rates of the resulting powder are significantly improved. On the other hand, when using water only, the discharge characteristics at high C rates are not satisfying.

The process according to the present invention for the production of $LiFePO_4$ powder comprises as a first step the provision of an aqueous solution of an organic surfactant.

In a preferred embodiment, the organic surfactant comprises a cation of formula $NR_1R_2R_3R_4^+$, wherein $R_1$, $R_2$, $R_3$ and $R_4$ are independently from each other hydrocarbon chains. Preferably, $R_1$, $R_2$, $R_3$ and $R_4$ are independently selected from $C_1$-$C_{24}$ alkyl, $C_6$-$C_{24}$ aryl or $C_7$-$C_{24}$ aralkyl. In a more preferred embodiment, one or two groups out of $R_1$, $R_2$, $R_3$ and $R_4$ are independently selected from $C_8$-$C_{20}$ alkyl or $C_7$-$C_{10}$ aralkyl and the other two or three groups out of $R_1$, $R_2$, $R_3$ and $R_4$ are $C_1$-$C_4$ alkyl, still more preferably $R_1$ is $C_{10}$-$C_{18}$ alkyl and $R_2$, $R_3$ and $R_4$ are $C_1$-$C_4$ alkyl. The counter anion is not specifically limited and is selected from any suitable counter anion. In a preferred embodiment, the counter anion is a halide, such as a chloride or bromide.

Specific examples of preferred organic surfactants according to the present invention are hexadecyltrimethylammonium bromide (CTAB), dodecyltrimethylammonium bromide (DTAB) or benzalkoniumchloride. In a preferred embodiment, the organic surfactant is CTAB or benzalkoniumchloride, more preferably the organic surfactant is CTAB.

The concentration of organic surfactant in the solution in is not specifically limited and can be selected by a person of ordinary skill in the art. For example, in case of CTAB, the solution of organic surfactant may have a concentration of 0.3-11 M. In addition, the stoichiometric ratio of the total amount of CTAB to $LiFePO_4$ to be produced is preferably 0.5:1 up to 3:1.

The process for the production of LiFePO$_4$ powder according to the present invention further comprises the step (b) of providing an aqueous solution of an iron (II) salt and mixing said aqueous iron (II) salt solution with an aqueous solution of a phosphate. The resulting mixed aqueous solution of iron (II) salt/phosphate has a stoichiometric ratio of Fe$^{2+}$:phosphate of about 1:1 (i.e. has a stoichiometric ratio of Fe$^{2+}$:phosphate of 0, 8:1 to 1.2:1, preferably 0, 9:1 to 1.1:1 more preferably of 1:1).

The iron (II) salt for providing an aqueous solution thereof is selected from any suitable iron (II) salt that is soluble in water and is capable of providing a LiFePO$_4$ precipitate. Preferred examples are FeSO$_4$ and FeCl$_2$. Most preferably, FeSO$_4$ is used as the iron (II) salt; that is to say, the hydrate thereof, i.e. FeSO$_4$.7H$_2$O. Examples of FeSO$_4$.7H$_2$O that are commercially available and are suitable for the purpose of the present invention are FeSO$_4$ TIOXIDE and FeSO$_4$ FERRO DUO FL.

The concentration of the aqueous solution of iron (II) salt such as FeSO$_4$.7H$_2$O is preferably 0.7-2.0 M.

As regards the phosphate source, any source of phosphate that is soluble in water and is capable of providing a LiFePO$_4$ precipitate can be used according to the present invention for providing the aqueous solution of phosphate used in step (b). For example, H$_3$PO$_4$ and (NH$_4$)$_2$HPO$_4$ is preferably used as phosphate source. Most preferably, H$_3$PO$_4$ is used. The concentration of phosphate in the aqueous solution of a phosphate source before mixing with the aqueous solution of the iron (II) salt is preferably in the range of 0.7-2.0 M.

Subsequently, the mixed iron (II) salt/phosphate solution is added to the surfactant solution under constant stirring. After adding of the mixed iron (II) salt/phosphate solution to the surfactant solution is completed, the resulting solution may preferably be stirred for a few further minutes.

The process of the present invention further comprises step (d) of providing an aqueous solution comprising a lithium salt, adding said aqueous solution comprising a lithium salt to said mixed iron (II) salt/phosphate solution to provide a mixture having a stoichiometric ratio of Fe$^{2+}$:phosphate:lithium salt of about 1:1:3 and stirring the resulting mixture.

Suitable lithium salts that may be employed according to the present invention are any lithium salts that are soluble in water and do not interfere with the remaining compounds used, i.e. are capable of providing a LiFePO$_4$ precipitate. For example, the lithium salt may be selected from LiOH, LiNO$_3$ and Li$_2$SO$_4$ such as Li$_2$SO$_4$×H$_2$O. When selecting a suitable Li source, the choice of phosphate source needs to be considered. For example, when selecting a neutral phosphate source such as (NH$_4$)$_2$HPO$_4$, a neutral Li source or a mixture of neutral and basic Li source is preferably used. Neutral Li sources are LiNO$_3$ or Li$_2$SO$_4$, while LiOH is an example for a basic Li source. In preferred embodiments, H$_3$PO$_4$ is used as the phosphate source in combination with LiOH the lithium source. Alternatively, (NH$_4$)$_2$HPO$_4$ may be used as the phosphate source in combination with a mixture of Li$_2$SO$_4$ and some LiOH as Li sources. The pH value of the resulting solution can be adjusted between 6.5-9 by addition of a base (e.g. NH$_3$ or a suitable hydroxide). Typically, the pH of the resulting solution is about 6.9-7.5, preferably 7.2-7.5.

The concentration of the lithium salt in the aqueous solution thereof is preferably 1.5-5 M. The final concentrations of the various ions in the solution after combining thereof is: concentration of Fe$^{2+}$ and PO$_4^{3-}$ in the range between 0.15 and 1.0 M; concentration of Li$^+$ in the range of 0.4 to 3 M. In a preferred embodiment, the concentration of Fe$^{2+}$ and PO$_4^{3-}$ is 0.22 M, the concentration of Li$^+$ is 0.66 M and the concentration of organic surfactant such as CTAB is 0.25 M.

After combining the respective solutions, the resulting mixture is rigorously stirred for approximately one minute.

The present invention is especially characterized in that a co-solvent is added during or after any one of steps (a) to (d). That is to say, the co-solvent is added according to the present invention as long as the components (the organic surfactant, the iron (II) salt, the phosphate, and the lithium salt) are still dissolved in the aqueous solutions, i.e. before precipitation occurs after heating in step (e). The co-solvent may be added in one portion, e.g. during step (a) to provide a solution of organic surfactant in a mixture of water and co-solvent, or may be added in several portions during any one of steps (a) to (d).

The co-solvent to be used in addition to water is preferably a C$_1$-C$_4$ alcohol. For example, especially preferred co-solvents are ethanol and isopropanol.

The amount of co-solvent ranges from more than 0% by volume (i.e. the presence of a detectable amount of co-solvent) to up to 40% by volume. The data refers to the total volume of the final solution obtained in step (d). In a preferred embodiment, the lower limit of the amount of co-solvent is about 1% by volume, preferably 5% by volume, more preferably 10% by volume or 15% by volume. The maximum amount of co-solvent is preferably between 40% by volume and 20% by volume. For example, the maximum amount of co-solvent may be 35% by volume, 30% by volume, or 25% by volume.

In a further preferred embodiment, the co-solvent is added during step (a) to provide a solution of organic surfactant in a mixture of water and co-solvent.

After combining the solutions, the mixture is heat-treated for providing a precipitate of LiFePO$_4$. For this purpose, the aqueous mixture is quickly transferred into a suitable container. Examples are a Teflon-lined stainless steel autoclave, a Teflon bottle or a Parr reactor. Heat treatment is carried out at 80° C.-200° C. preferably 80°-130° C. Most preferably, heat treatment is carried out at 120° C., especially when using CTAB as the organic surfactant. In a preferred embodiment, heat treatment is carried out for about 4 hours to about 12 hours or more. More preferably, heat treatment is carried out for about 8 hours to about 12 hours. Most preferably, heat treatment is carried out for about 12 hours. During heat treatment, a light green precipitate is formed. After cooling to room temperature, the resulting LiFePO$_4$ precipitate is washed with water to ensure the complete elimination of excess of surfactant. Typically, the precipitate is washed several times with deionized water. Subsequently, the washed precipitate is filtered and dried. For example, drying may be achieved by maintaining at 40° C. over night.

The process of the present invention further comprises step (g) of heat treating the dried precipitate in an inert atmosphere by firing at 550-850° C. for at least 2 hours. The heat treatment is carried out in an inert atmosphere to avoid the oxidation of Fe$^{2+}$ to Fe$^{3+}$. Thus, an inert atmosphere in the sense of the present invention is a non-oxidizing atmosphere. For example, N$_2$ may be used in accordance with the present invention.

Alternatively, heat treating the precipitate (firing) may be carried out according to the present invention in a weakly reducing atmosphere. For example, an Ar/H$_2$ (3%) flux may be used instead of a pure N$_2$ flux during firing.

Heat treatment of the dried precipitate may be carried out in various ways. For example, a pre-treatment at 200° C.

may be carried out for about two hours (heating rate of 5.0° C./min) and then firing may be carried out at 615° C. for 12 hours (2.0° C./min) in order to obtain the crystalline phase and to carbonize the surfactant, so obtaining a carbon film that homogenously covers the grains. Alternatively, firing may be carried out in one step for a specific duration at a specific temperature starting with a specific heating rate. For example, heat treatment may be carried out for 12 hours at 615° C. with a heating rate of 2° C./min. The firing time is preferably 4 to 20 hours, more preferably 8 to 14 hours and most preferably 12 hours. The heating rate is preferably 0.5 to 7.5° C./min, more preferably 1 to 5° C./min, most preferably 2° C./min. Firing temperature (final value reached after the initial heating) is preferably 570 to 720° C., more preferably 600 to 700° C., still more preferably 600 to 630° C. and most preferably 615° C.

In the process according to the present invention, a supplementary carbon source may optionally be added during synthesis. The additional carbon source may contribute to the electrochemical properties of the obtained powder by forming additional carbon material in or on the final particles. The supplementary carbon source is generally mixed together with an organic surfactant solution. In addition or as alternative, the supplementary carbon source may be added to the dried powders before the firing step.

The $LiFePO_4$ powder obtainable by means of the above process is distinguished from previously known powders in its electrochemical performance. In particular, the electrochemical behavior at high current regimes is significantly improved. Accordingly, the present invention also relates to a $LiFePO_4$ powder obtainable by using the above process.

Due to the use of organic surfactant, and optionally an additional carbon source, which are carbonized during heat treatment of the dried precipitate, the powder obtained according to the present invention is characterized in a carbon content of preferably 1 to 5% by weight, especially when using CTAB as the organic surfactant.

Moreover, the powder obtained according to the present invention is characterized in a BET surface area of 15 to 60 $m^2/g$. A preferred embodiment, the BET surface specific area ranges between 30 and 50 $m^2/g$. The BET surface area is determined by means of gas adsorption as known in the art in accordance with the method of Brunauer, Emmett and Teller.

Furthermore, the powder obtained according to the present invention is preferably characterized in an average particle size of 100 to 300 nm determined by scanning electron microscopy (SEM). Furthermore, the size of the crystallites is preferably 20 to 50 nm as determined by Rietveld refinement and transmission electron microscopy (TEM).

The $LiFePO_4$ powder according to the present invention may be used in a cathode material for a lithium-ion cell. The design of the lithium-ion cell is in principle known in the art and is only distinguished from prior art lithium-ion cells in a use of the specific powder obtained according to the present invention. The cathode material for the lithium-ion cell is preferably prepared by combining the $LiFePO_4$ powder according to the present invention with a binder material and an electric conductor. Suitable electric conductors are known in the art. Typical examples thereof include acetylene black, super-P carbon, carbon vulcan, ketjen black, graphite, multi-walled carbon nanotube (MWCNT) or conducting polymers (e.g., Polypyrrole, Polyaniline, Polythiophene, PEDOT, etc. . . . ).

Furthermore, suitable binders are known in the art. Typical examples thereof include polyvinylidene fluoride (PVdF), polytetrafluoro ethylene (PTFE), olefin polymers (e.g., polyethylene, polypropylene, etc. . . . ), carboxymethyl cellulose (CMC) or gelatin.

In addition, the present invention relates to a lithium-ion cell comprising an anode, a separator and a cathode comprising the above cathode material.

Further advantages of the present invention are apparent from the following examples.

Working Examples $LiFePO_4$ powder was prepared in accordance with the report of G. Meligrana, C. Geribaldi, A. Tuel, S. Bodoardo, N. Penazzi, Journal of Power Sources 160 (2006), 516 bis 522 (comparative example) and with the modification of using a mixture of water and ethanol (20 weight percent), or water and isopropanol (20 weight percent) as the solvent for dissolving the organic surfactant.

Details of the direct mild hydrothermal synthesis for preparing nanostructured lithium iron phosphate powders are as follows.

Starting materials were: $FeSO_4 \cdot 7H_2O$ (Aldrich, purity 99%), $H_3PO_4$ (Aldrich, purity>85%), LiOH (Aldrich, purity>98%) in the stoichiometric ratio 1:1:3, hexadecyltrimethylammonium bromide (Aldrich, $C_{19}H_{42}BrN$, CTAB), $CH_3CH_2OH$ (Fluka, purity>99.8%) and distilled $H_2O$.

1. A CTAB solution is prepared in a PTFE bottle (KARTELL Fluoroware, 100 mL), by slowly stirring the white powder in a solution of water and ethanol (0.0124 mol of CTAB in a mixed solution of 15 g of distilled $H_2O$ and 10 g of $CH_3CH_2OH$) at 35° C. for 120 minutes in order to completely dissolve it and obtain a clear solution.

2. A $FeSO_4$ water solution (0.0124 mol of $FeSO_4 \cdot 7H_2O$ in 15 g of distilled $H_2O$) is prepared, in a 25 mL beaker, and mixed with $H_3PO_4$ (0.0124 mol).

3. The $FeSO_4/H_3PO_4$ mixed solution is added to the surfactant solution (sol. 1) under constant stirring. The resulting solution is slowly stirred for few (2-3) minutes.

4. In the end, the LiOH solution (0.0372 mol of LiOH in 15 g of distilled $H_2O$, prepared in a 25 mL beaker) is added, so avoiding the formation of $Fe(OH)_2$ which can be easily oxidized to $Fe^{3+}$.

5. The obtained mixture, whose pH value ranged between 6.9 and 7.5, is vigorously stirred for 1 min, and then quickly transferred in an oven (BINDER APT.Line model ED 53, volume 53 L, T range 20-300° C.) and heated at 120° C. for 5 hours.

6. The bottle is then cooled to ambient temperature. The resulting green precipitate is washed several times with distilled water (500 mL) to ensure the complete elimination of the excess of surfactant, filtered and dried at 40° C. overnight (BINDER APT.Line model ED 53).

7. The heating treatment is carried out in nitrogen to avoid the oxidation of $Fe^{2+}$ to $Fe^{3+}$: the powders are fired at 615° C. (heating rate of 2.0° C. $min^{-1}$), in a tubular furnace (CARBOLITE Model MTF 12/38/400, max Temp. 1200° C.), under pure $N_2$ flux for 12 hours, in order to obtain the crystalline phase and to carbonize the surfactant thus producing the carbon-coating on the particles.

Characterization, electrode preparation and testing was carried out as described below.

The X-ray diffraction profiles of the samples were obtained using a Philips Xpert MPD powder diffractometer, equipped with Cu-Kα radiation (V=40 kV, i=30 mA) and a curved graphite secondary monochromator. The diffraction data were collected in the 2θ-range between 10 and 80°, with an acquisition step of 0.02° and a time per step of 10 s. The samples were also submitted to a scanning electron microscope (SEM) investigation for morphological characterization, using a FEI Quanta Inspect 200LV microscope (max magnification of $1.5 \times 10^5$).

The electrodes for the evaluation of the electrochemical properties were prepared by spreading on an aluminum current-collector, following the so-called "doctor blade" technique, a slurry of the $LiFePO_4$ active material (70 weight %) with acetylene black as electronic conductor (Shawinigan Black AB50, Chevron Corp., USA, 20 weight %) and poly(vinylidene fluoride) as binder (PVdF, Solvay Solef 6020, 10 weight %) in N-methyl-2-pyrrolidone (NMP, Aldrich). After the evaporation of the solvent by a mild heating, disks of 0.785 cm² were punched out of the foil and dried by heating them at 130° C. under high vacuum for 5 h. After their transfer in an Ar-filled dry glove box (MBraun Labstar, $O_2$ and $H_2O$ content<0.1 ppm), the disks were weighed before their use in the test cells and, by subtraction of the average weight of the Al disks, the weight of the coating mixture was calculated. The composite electrodes were used in three electrode T-cells with lithium metal (high purity lithium ribbons, Aldrich) as both the counter and the reference electrodes and two glass-wool (Whatman GF/A) discs as the separator. The liquid electrolyte used was 1.0M $LiPF_6$ in a 1:1 mixture of ethylene carbonate (EC) and diethyl carbonate (DEC) (Ferro Corp., battery grade).

The electrochemical behavior of the synthesized $LiFePO_4$ samples as cathodes for Li-based batteries was tested by cyclic voltammetry and galvanostatic discharge/charge cycling with an Arbin Instruments model BT2000-Battery Testing System ($I_{max}$=10 A, V=±5 V). The liquid electrolyte used was 1.0 M $LiPF_6$ in a 1:1 mixture of ethylene carbonate (EC) and diethyl carbonate (DEC) (Ferro Corp., battery grade). Cyclic voltammetries (CVs) were carried out at room temperature in three electrode T-cells (equipped with three stainless-steel SS-316 current collectors) with lithium metal as both the counter and the reference electrode. The potential ranged between 2.50 and 4.20 V versus $Li^+/Li$ with a scan rate of 0.100 mV s$^{-1}$. The scanning begins towards the increasing potential branch, choosing as starting value the O.C.V. of the cell. The galvanostatic discharge-charge cycling tests were performed at room temperature in Teflon-made Swagelok cells, equipped with two stainless-steel SS-316 current collectors, with lithium metal as the anode, setting the cut-off voltages to 2.50-4.00 V versus $Li^+/Li$. The cycling charge/discharge performance of the cells were evaluated as a function of the cycle number, at room temperature and at different C-rates ranging from C/20 to 100 C (1 C current rate=170 mA g$^{-1}$). The C-rate measures the applied current to charge or discharge a battery; it is expressed in fractions or multiples of C. A C-rate of 1 C corresponds to the current required to fully discharge a battery in 1 hour, 0.5 C or C/2 refers to the current to discharge in two hours and 2 C to discharge in half an hour).

Obtained Results

1. XRD Characterization

Figure 1:
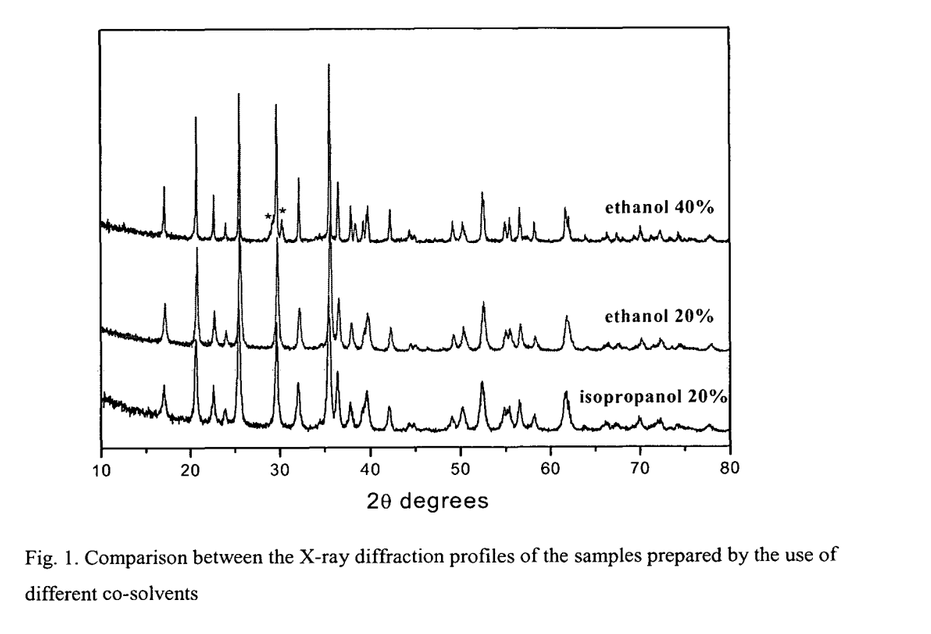
FIG. 1 shows a comparison between X-ray diffraction profiles of the samples prepared by the use of different co-solvents in different amounts.

The analysis on the X-ray powder diffraction pattern of the samples shows (FIG. 1) a good correspondence with the reference $LiFePO_4$ pattern. Samples look well-crystallized. Only the sample with higher amount of ethanol shows the presence of few foreign crystalline phases.

2. SEM Analysis

Figure 2:
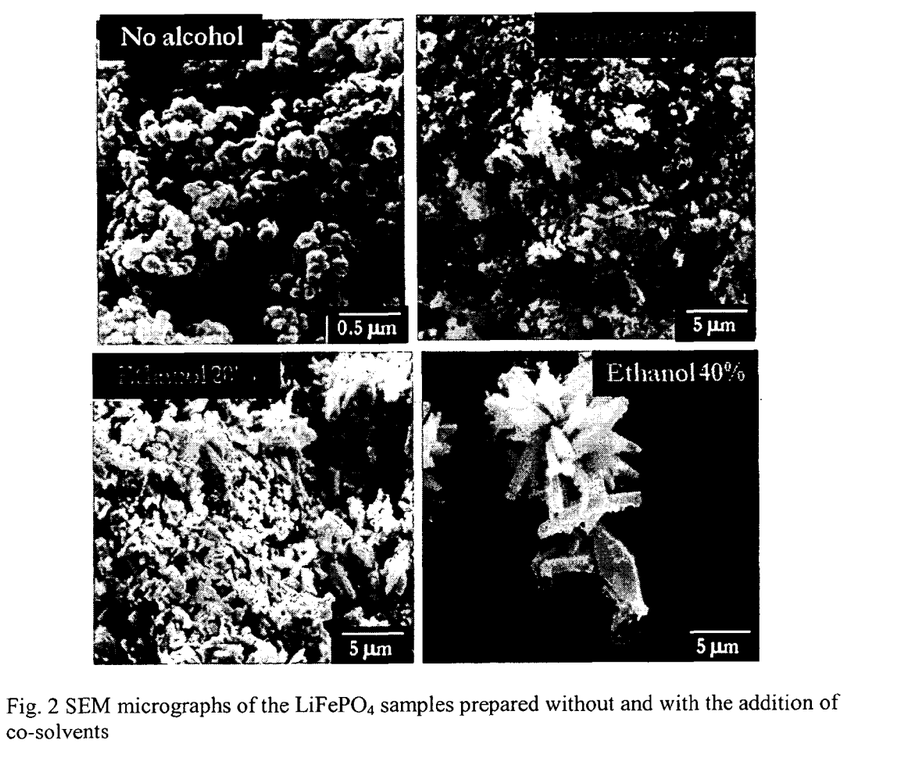
FIG. 2 shows SEM micrographs $LiFePO_4$ samples prepared without and with the addition of co-solvents.

Morphology of $LiFePO_4$ samples were studied by SEM microscopy (FIG. 2). The typical morphology of the sample prepared without addition of co-solvents such as alcohols presents small spherical particles. A small amount of alcohol drastically changes the morphology: both samples prepared by addition of ethanol or isopropanol show larger particles, more elongated and lost of the spherical shape. When the amount of ethanol increases the grains obtained are larger and show very regular rhomboidal particles.

3. Electrochemical Tests

Samples prepared without alcohol addition, as already reported in G. Meligrana et al., J. Power Sources 160 (2006) 516 without using co-solvent, show interesting electrochemical performance at low current rate. However, the capacity of this sample falls at high C-rate regimes. Electrochemical data of samples synthesized by the use of alcohols, compared with data of the $LiFePO_4$ prepared without co-solvent, are reported in FIG. 3.

Figure 3:
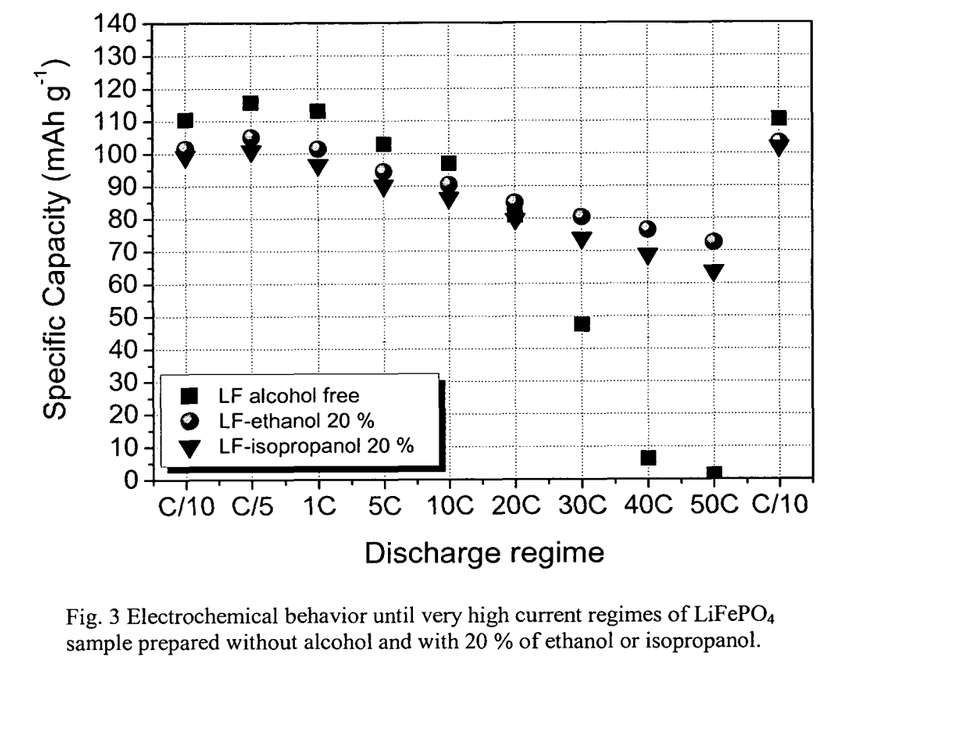
FIG. 3 shows the electrochemical behavior till very high current regimes of $LiFePO_4$ samples prepared with alcohol and with 20 volume percent of ethanol and isopropanol.

As can be taken from FIG. 3, when using a co-solvent for dissolving the organic surfactant, the electrochemical behavior even at very high discharge rates (i.e. >50 C) is substantially maintained, while in case of using an aqueous solution of organic surfactant only, the electrochemical performance at discharge rates higher than 20 C significantly drops.

The invention claimed is:

1. A process for the production of $LiFePO_4$ powder, comprising the steps:
   a) providing an aqueous solution of an organic surfactant;
   b) providing an aqueous solution of an iron (II) salt and mixing said aqueous iron (II) salt solution with an aqueous solution of a phosphate, to provide a mixed iron (II) salt/phosphate solution having a stoichiometric ratio of $Fe^{2+}$:phosphate of about 1:1;
   c) adding the mixed iron (II) salt/phosphate solution to the surfactant solution under constant stirring;
   d) providing an aqueous solution comprising a lithium salt, adding said aqueous solution comprising a lithium salt to said mixed iron (II) salt/phosphate solution to provide a mixture having a stoichiometric ratio of $Fe^{2+}$:phosphate:lithium salt of about 1:1:3 and stirring the resulting mixture;
   e) heating the resulting mixture at 80-200° C.;
   f) washing the resulting precipitate to remove excess surfactant, filtering and drying the precipitate; and
   g) heat treating the dried precipitate in an inert atmosphere by firing at 550-850° C. for at least 2 hours,
   wherein a co-solvent is added during step (a) to provide a solution of organic surfactant in a mixture of water and co-solvent.

2. The process according to claim 1, wherein the organic surfactant comprises a cation of formula $NR_1R_2R_3R_4^+$, wherein $R_1$, $R_2$, $R_3$ and $R_4$ are independently from each other hydrocarbon chains.

3. The process according to claim 1 or 2, wherein the organic surfactant is selected from the group consisting of hexadecyltrimethylammonium bromide (CTAB), dodecyltrimethylammonium bromide (DTAB), and benzalkonium chloride.

4. The process according to claim 1 or 2, wherein the co-solvent is an alcohol.

5. The process according to claim 1 or 2, wherein the co-solvent is used in an amount of more than 0% by volume to up to 40% by volume, based on the total volume of the final solution obtained in step (d).

6. The process according to claim 1 or 2, wherein the solution of organic surfactant of step (a) has a concentration of 0.3 to 1M.

7. The process according to claim 1 or 2, wherein the step of heat treating the dried precipitate is carried out by firing at 600-700° C.

8. The process according to claim 1 or 2, wherein firing is carried out for at least 10 hours.

9. The process according to claim 1 or 2, wherein the organic surfactant is CTAB and the stoichiometric ratio of the total amount of CTAB:LiFePO$_4$ is 0.5-3:1.

10. The process according to claim 2, wherein $R_1$, $R_2$, $R_3$ and $R_4$ are independently selected from the group consisting of $C_1$-$C_{24}$ alkyl, $C_6$-$C_{24}$ aryl, and $C_7$-$C_{24}$ aralkyl.

11. The process according to claim 10, wherein one or two groups out of $R_1$, $R_2$, $R_3$ and $R_4$ are independently selected from the group consisting of $C_8$-$C_{20}$ alkyl and $C_7$-$C_{10}$ aralkyl, and wherein the other two or three groups out of $R_1$, $R_2$, $R_3$ and $R_4$ are $C_1$-$C_4$ alkyl.

12. The process according to claim 11, wherein $R_1$ is $C_{10}$-$C_{18}$ alkyl, and $R_2$, $R_3$ and $R_4$ are $C_1$-$C_4$ alkyl.

13. The process according to claim 3, wherein the organic surfactant is CTAB or benzalkonium chloride.

14. The process according to claim 13, wherein the organic surfactant is CTAB.

15. The process according to claim 4, wherein the co-solvent is a $C_1$-$C_4$ alcohol.

16. The process according to claim 15, wherein the $C_1$-$C_4$ alcohol is ethanol or isopropanol.

17. The process according to claim 5, wherein the co-solvent is used in an amount of 5% by volume to 35% by volume, based on the total weight of the final solution obtained in step (d).

18. A process for the production of LiFePO$_4$ powder, comprising the steps:
 a) providing an aqueous solution of an organic surfactant;
 b) providing an aqueous solution of an iron (II) salt and mixing said aqueous iron (II) salt solution with an aqueous solution of a phosphate, to provide a mixed iron (II) salt/phosphate solution having a stoichiometric ratio of $Fe^{2+}$:phosphate of about 1:1;
 c) adding the mixed iron (II) salt/phosphate solution to the surfactant solution under constant stirring;
 d) providing an aqueous solution comprising a lithium salt, adding said aqueous solution comprising a lithium salt to said mixed iron (II) salt/phosphate solution to provide a mixture having a stoichiometric ratio of $Fe^{2+}$:phosphate:lithium salt of about 1:1:3 and stirring the resulting mixture;
 e) heating the resulting mixture at 80-200° C.;
 f) washing the resulting precipitate to remove excess surfactant, filtering and drying the precipitate; and
 g) heat treating the dried precipitate in an inert atmosphere by firing at 550-850° C. for at least 2 hours,
 wherein a co-solvent is added during or after any of steps (a) to (d), wherein the solution of organic surfactant of step (a) has a concentration of 0.3 to 1M, and wherein the organic surfactant is CTAB.

* * * * *